(12) United States Patent
Hsu et al.

(10) Patent No.: US 11,533,462 B2
(45) Date of Patent: Dec. 20, 2022

(54) AUTO WHITE BALANCE ADJUSTING METHOD AND AUTO WHITE BALANCE ADJUSTING SYSTEM FOR CALIBRATING IMAGES BY USING DUAL COLOR SPACES

(71) Applicant: WELTREND SEMICONDUCTOR INC., Hsinchu (TW)

(72) Inventors: Te-Wei Hsu, Hsinchu (TW); Hsuan-Ying Chen, Hsinchu (TW); Chun-Ying Li, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 0 days.

(21) Appl. No.: 17/540,160

(22) Filed: Dec. 1, 2021

(65) Prior Publication Data
US 2022/0329769 A1    Oct. 13, 2022

(30) Foreign Application Priority Data
Apr. 13, 2021    (TW) .................................. 110113190

(51) Int. Cl.
*H04N 9/73*    (2006.01)
*H04N 9/797*   (2006.01)
*H04N 9/793*   (2006.01)

(52) U.S. Cl.
CPC ............. *H04N 9/735* (2013.01); *H04N 9/793* (2013.01); *H04N 9/7973* (2013.01)

(58) Field of Classification Search
CPC ...... H04N 1/6077; H04N 1/6086; H04N 9/73; H04N 9/735
USPC ...................................................... 348/223.1
See application file for complete search history.

(56) References Cited

U.S. PATENT DOCUMENTS

| 2009/0046928 A1* | 2/2009 | Kwak | H04N 1/608 |
| | | | 382/167 |
| 2009/0097745 A1* | 4/2009 | Kim | H04N 9/73 |
| | | | 382/167 |
| 2009/0147099 A1* | 6/2009 | Kim | H04N 9/735 |
| | | | 348/E9.051 |
| 2010/0214434 A1 | 8/2010 | Kim | |
| 2015/0371370 A1* | 12/2015 | Yao | G06V 10/60 |
| | | | 382/167 |

FOREIGN PATENT DOCUMENTS

| CN | 111669560 A | * | 9/2020 | ............... H04N 9/73 |
| CN | 111669560 A | | 9/2020 | |
| CN | 112492286 A | * | 3/2021 | ............... H04N 9/73 |
| CN | 112492286 A | | 3/2021 | |

* cited by examiner

*Primary Examiner* — Anthony J Daniels
(74) *Attorney, Agent, or Firm* — Winston Hsu

(57) ABSTRACT

An auto white balance adjusting method includes determining a white pixel area according to a standard of a first color space, selecting a plurality of pixels of an image according to the white pixel area, generating an average color value of the plurality of pixels in the first color space, converting the average color value in the first color space to three primary color gains in a second color space, generating three primary color target gains according to the three primary color gains and a color temperature curve, and gradually adjusting a white balance of the image to meet the three primary color target gains according to the average color value in the first color space and the three primary color gains in the second color space. The first color space and the second color space are different.

20 Claims, 5 Drawing Sheets

AUTO WHITE BALANCE ADJUSTING METHOD AND AUTO WHITE BALANCE ADJUSTING SYSTEM FOR CALIBRATING IMAGES BY USING DUAL COLOR SPACES

BACKGROUND OF THE INVENTION

1. Field of the Invention

The present invention relates to an auto white balance adjusting method and an auto white balance adjusting system, and more particularly, an auto white balance adjusting method and an auto white balance adjusting system for calibrating images by using dual color spaces.

2. Description of the Prior Art

With the rapid development of technology, various light sensors and image processing methods are applied in our daily life. Light sensors and image processing methods are used for restoring true colors of images under current environmental light. Different environments cause different light sources. Since different light sources have different color temperatures, when an object is illuminated by different light sources, the object may present different colors. The color temperature can be quantized as a "K" value. When the "K" value is decreased, the color of the object becomes reddish in hue. When the "K" value is increased, the color of the object becomes bluish in hue. Therefore, when various light sources are illuminated to the object, the color shift of the object occurs, leading to a severe white balance offset.

In image processing technologies, a purpose of adjusting the white balance is to calibrate the color shift. When the color shift of the image is calibrated, the image can approach its true colors. In general, the color shift of the image is obvious when the color shift of a "white" object occurs. Therefore, the "white color" is usually used as a reference color for eliminating the color shift. However, different cameras have different photosensitive elements and different white balance adjustment processes. Since the red (R), green (G), and blue (B) colors detected by the photosensitive element of the camera are unbalanced under different color temperatures, color distortion is prone to occur. For example, the color temperature of the image is obviously reddish or bluish under specific light sources. Therefore, adjusting the white balance of the image is an important issue for the image processing technology. Currently, two white balance adjusting methods are commonly used, denoted as gray world algorithm and perfect reflector algorithm. In the gray world algorithm, a drawback is that when the color in the image is relatively monotonous, the white balance adjustment performance may be greatly decreased. In the perfect reflection algorithm, when the brightest area in the image is not absolutely white, the white balance adjustment performance may be greatly decreased. Therefore, to develop an optimized and automatic white balance adjusting method is an important issue.

SUMMARY OF THE INVENTION

In an embodiment of the present invention, an auto white balance adjusting method is disclosed. The auto white balance adjusting method comprises determining a white pixel area according to a standard of a first color space, selecting a plurality of pixels of an image according to the white pixel area, generating an average color value of the plurality of pixels in the first color space, converting the average color value in the first color space to three primary color gains in a second color space, generating three primary color target gains according to the three primary color gains and a color temperature curve, and gradually adjusting a white balance of the image to meet the three primary color target gains according to the average color value in the first color space and the three primary color gains in the second color space. The first color space and the second color space are different.

In another embodiment of the present invention, an auto white balance adjusting system is disclosed. The auto white balance adjusting system comprises an image capturing device configured to acquire an image, a memory configured to save data, an output device configured to output an white balance adjusted image, and a processor coupled to the image capturing device, the memory, and the output device and configured to control the image capturing device, the memory, and the output device. After the image capturing device acquires the image, the processor determines a white pixel area according to a standard of a first color space saved in the memory. The processor selects a plurality of pixels of an image according to the white pixel area. The processor generates an average color value of the plurality of pixels in the first color space. The processor converts the average color value in the first color space to three primary color gains in a second color space. The processor generates three primary color target gains according to the three primary color gains and a color temperature curve. The processor gradually adjusts a white balance of the image to meet the three primary color target gains according to the average color value in the first color space and the three primary color gains in the second color space. The processor controls the output device to output the white balance adjusted image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
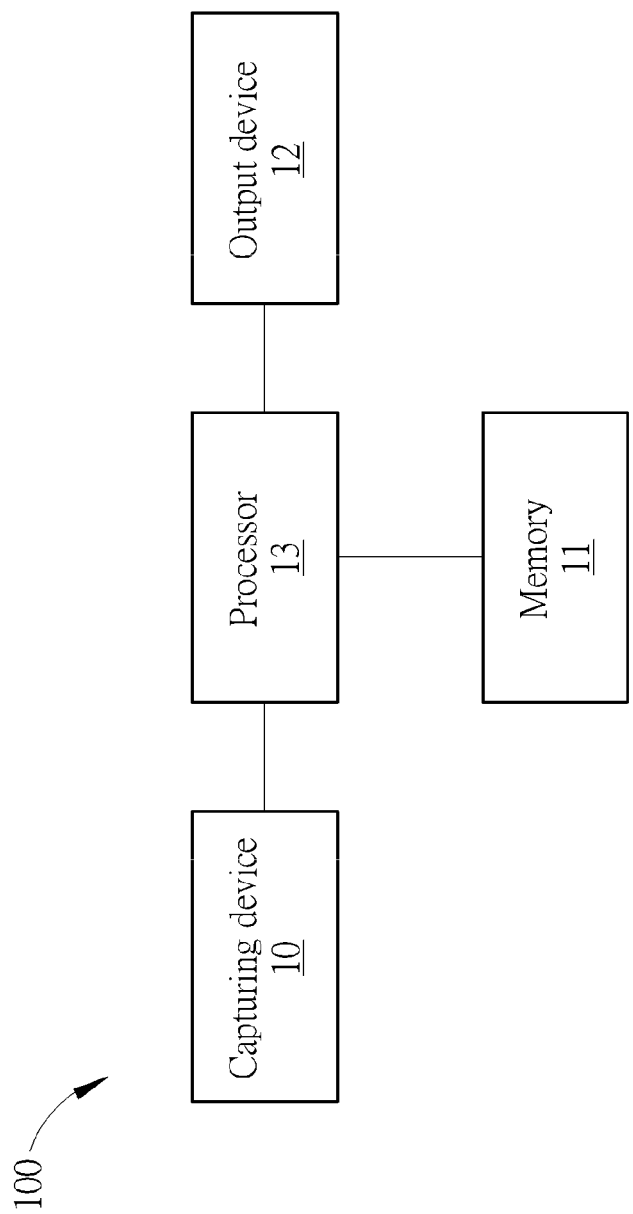
FIG. 1 is a block diagram of an auto white balance adjusting system according to an embodiment of the present invention.

FIG. 1 is a block diagram of an auto white balance (AWB) adjusting system 100 according to an embodiment of the present invention. The AWB adjusting system 100 is capable of continuously calibrating white balance of a color shifted image under various light sources. The AWB adjusting system 100 can include an image capturing device 10, a memory 11, an output device 12, and a processor 13. The image capturing device 10 is used for acquiring an image. The image capturing device 10 can be a camera or any device having photosensitive elements. The memory 11 is used for saving data. The output device 12 is used for outputting a white balance adjusted image. The output device 12 can be a screen, an image output port device, or a projection system. The processor 13 is coupled to the image capturing device 10, the memory 11, and the output device 12 for controlling the image capturing device 10, the memory 11, and the output device 12. The AWB adjusting system 100 can adjust the white balance by using information of dual color spaces, thereby leading to high reliability.

In the AWB adjusting system 100, after the image capturing device 10 acquires the image, the processor 13 can determine the white pixel area according to a standard of a first color space (i.e., such as a Luminance-Chrominance color space, YUV) saved in the memory 11. The processor 13 can select a plurality of pixels of the image according to the white pixel area. Further, the processor 13 can generate an average color value of the plurality of pixels in the first color space. The processor 13 can convert the average color value in the first color space to three primary color gains in a second color space (i.e., such as a three primary color space, RGB). The processor 13 can generate three primary color target gains according to the three primary color gains and a color temperature curve. The processor 13 gradually adjusts a white balance of the image to meet the three primary color target gains according to the average color value in the first color space and the three primary color gains in the second color space. Finally, the processor 13 can control the output device 12 to output the white balance adjusted image.

Figure 2:
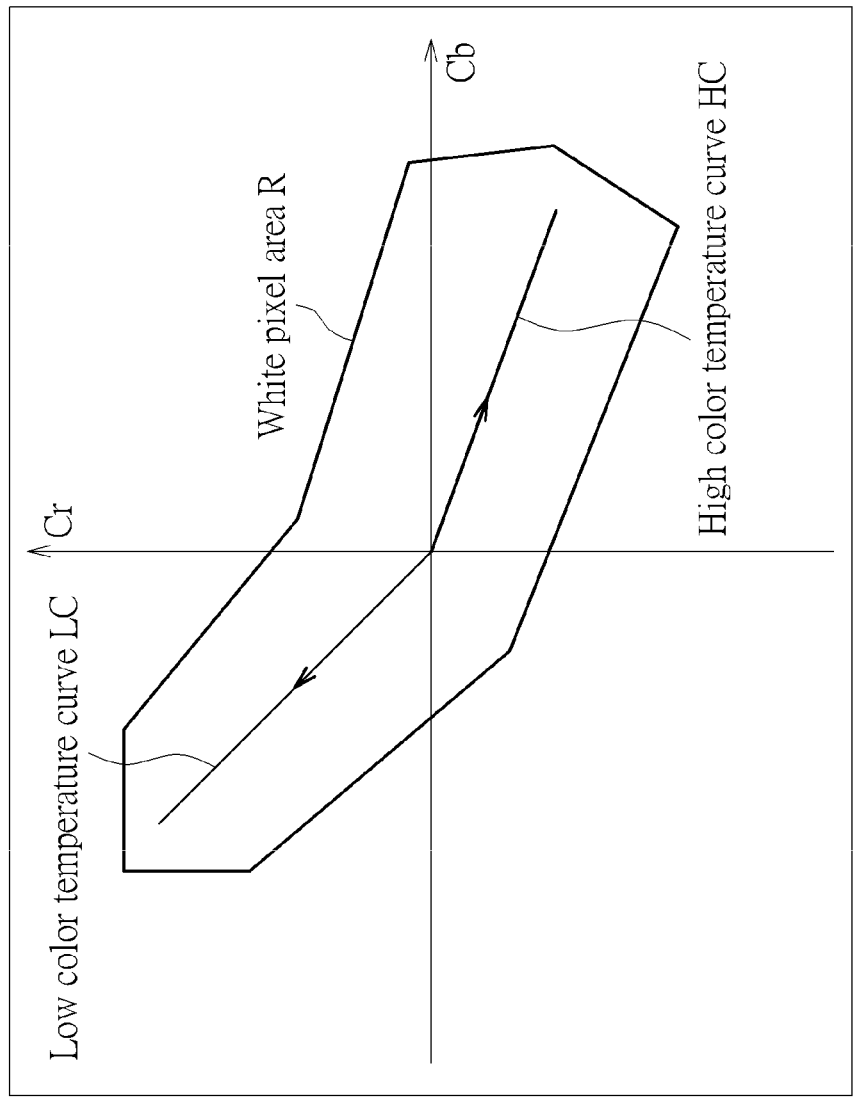
FIG. 2 is an illustration of determining a white pixel area of a first color space of the auto white balance adjusting system in FIG. 1.

FIG. 2 is an illustration of determining the white pixel area R of the first color space of the AWB adjusting system 100. As previously mentioned, the first color space is the Luminance-Chrominance color space (YUV color space). The second color space is the three primary color space (RGB color space). In the YUV color space, as shown in FIG. 2, Cr is a red chromaticity axis. Cb is a blue chromaticity axis. Therefore, a CrCb table of FIG. 2 can be previously stored in the memory 11. The white pixel area R can be a customized area or a system default area. A range of the white pixel area R may include a high color temperature curve HC and a low color temperature curve LC. After the white pixel area R is determined, the processor 13 can detect a plurality of corresponding white pixels in the image according to the white pixel area R. Then, the processor 13 can average color values of Y, U, and V of the plurality of white pixels for generating an average color value $YUV_{NWP}$ of the first color space (YUV color space). Then, the processor 13 can execute a color space conversion process for converting the average color value $YUV_{NWP}$ in the first color space (YUV color space) to three primary color gains ($R_{GAIN}$, $G_{GAIN}$, and $B_{GAIN}$) in the second color space (RGB color space). In other words, the processor 13 can convert the average color value $YUV_{NWP}$ in the first color space to a red color gain $R_{GAIN}$, a green color gain $G_{GAIN}$, and a blue color gain $B_{GAIN}$ in the second color space. Further, the processor 13 can normalize the red color gain $R_{GAIN}$, the green color gain $G_{GAIN}$, and the blue color gain $B_{GAIN}$. For example, the processor 13 can divide the red color gain $R_{GAIN}$ and the blue color gain $B_{GAIN}$ by the green color gain $G_{GAIN}$.

Figure 3B:
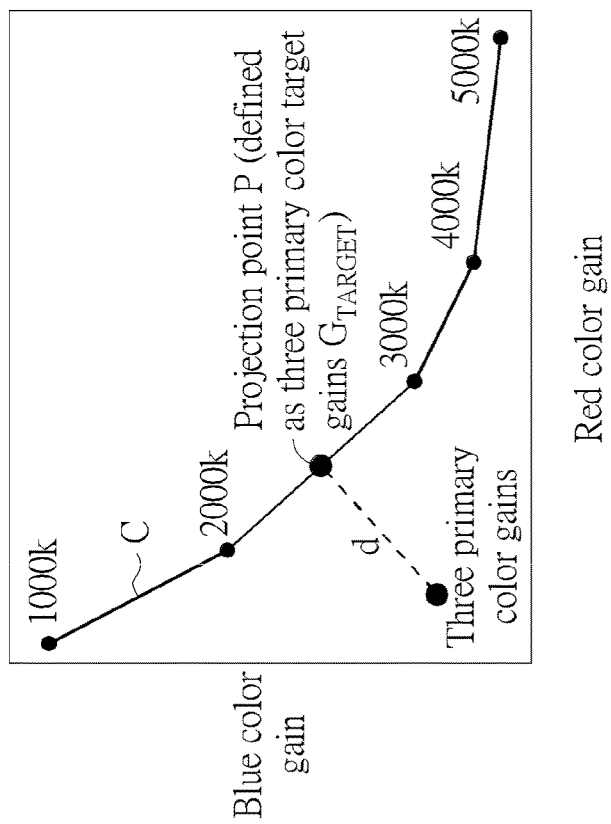
FIG. 3B is an illustration of a first correlation between the color temperature curve and three primary color target gains of the auto white balance adjusting system in FIG. 1.
Figure 3A:
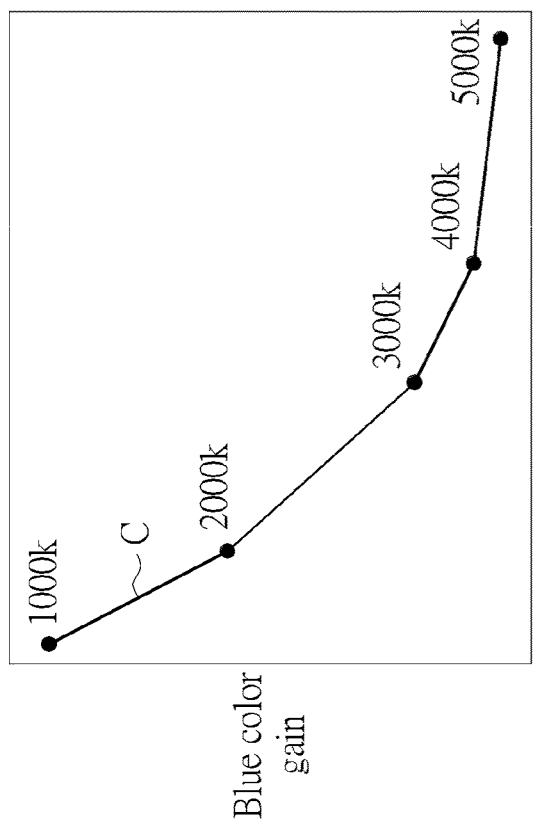
FIG. 3A is an illustration of a color temperature curve of a second color space of the auto white balance adjusting system in FIG. 1.

FIG. 3A is an illustration of a color temperature curve C of the second color space of the AWB adjusting system 100. In FIG. 3A, based on the second color space, the processor 13 can set a plurality of color temperature intervals according to the color temperature curve C previously defined. For example, the processor 13 can set "1000K" as a range of the color temperature intervals between color temperatures 1000K and 5000K. In other words, in FIG. 3A, 1000K~2000K can be defined as a color temperature interval. 2000K~3000K can be defined as a color temperature interval. 3000K~4000K can be defined as a color temperature interval. 4000K~5000K can be defined as a color temperature interval. Boundary points of a plurality of color intervals can be connected by a regression algorithm or a linear interpolation algorithm to build the color temperature curve C. Therefore, the color temperature curve C can be linear or non-linear. X axis is denoted as a normalized red color gain. Y axis is denoted as a normalized blue color gain. The color temperature curve C in FIG. 3A can be regarded as predetermined information saved in the memory 11.

FIG. 3B is an illustration of a first correlation between the color temperature curve C and three primary color target gains $G_{TARGET}$ of the AWB adjusting system 100. As previously mentioned, the processor 13 can convert the average color value $YUV_{NWP}$ in the first color space to three primary color gains in a second color space. Then, the processor 13 can generate the three primary color target gains $G_{TARGET}$ according to the three primary color gains and the color temperature curve C. Details are illustrated below. First, the processor 13 can set a threshold value Th. Then, the processor 13 can acquire a distance d between the three primary color gains and the color temperature curve C in a coordinate system of the second color space. The distance d can be defined as a Euclidean distance between two vectors, a square difference between two vectors, or an absolute difference between two vectors. When the distance d is greater than or equal to the threshold value Th, it implies the three primary color gains need to be calibrated. Therefore, the processor 13 can acquire a projection point P of the three primary color gains on the color temperature curve C for setting the projection point P as the three primary color target gains $G_{TARGET}$. Since the three primary color target gains $G_{TARGET}$ are located on the color temperature curve C, the calibration reliability can be increased.

Figure 3C:
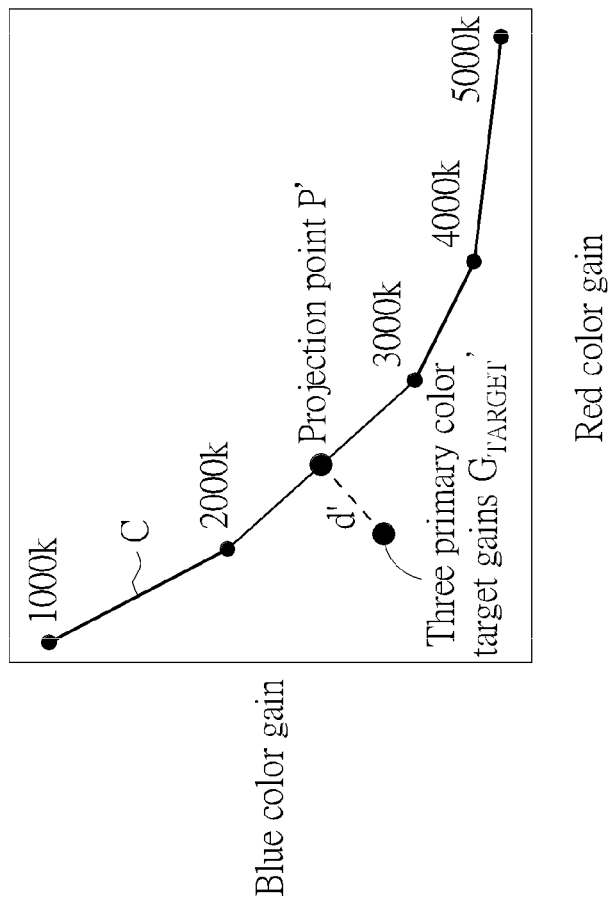
FIG. 3C is an illustration of a second correlation between the color temperature curve and three primary color target gains of the auto white balance adjusting system in FIG. 1.

FIG. 3C is an illustration of a second correlation between the color temperature curve C and three primary color target gains $G_{TARGET}'$ of the AWB adjusting system 100. As previously mentioned, the processor 13 can convert the average color value $YUV_{NWP}$ in the first color space to three primary color gains in a second color space. Then, the processor 13 can generate the three primary color target gains $G_{TARGET}'$ according to the three primary color gains and the color temperature curve C. Details are illustrated below. First, the processor 13 can set a threshold value Th. Then, the processor 13 can acquire a distance d' between the three primary color gains and the color temperature curve C in the coordinate system of the second color space. The distance d' can be defined as the Euclidean distance between two vectors, the square difference between two vectors, or the absolute difference between two vectors. When the distance d' is smaller than the threshold value Th, it implies coordinates of the three primary color gains approach the color temperature curve C. Therefore, the processor 13 can set the three primary color gains as the three primary color target gains $G_{TARGET}'$. Since the coordinates of the three primary color target gains $G_{TARGET}$ approach the color temperature curve C, the calibration reliability can be increased.

Further, an error detection mechanism can be introduced to the AWB adjusting system 100 for increasing the convergence rate and accuracy. First, the processor 13 can set a white pixel target value in the first color space. For example, the processor 13 can set the white pixel target value as 128. Further, the processor 13 can acquire a first error between the average color value $YUV_{NWP}$ and the white pixel target value. For example, the processor 13 can acquire the first error as a square error, a square root error, or an absolute error of sum of a difference between U gain and the white pixel target value and a difference between Y gain and the white pixel target value in the first color space (YUV color space). In other words, the first error can be regarded as a white balance error of the first color space. The processor 13 can update the three primary color gains in the second color space when the white balance of the image is gradually adjusted. Further, the processor 13 can acquire a second error of the three primary color gains when the three primary color gains are updated. For example, the processor 13 can acquire the second error as the square error, the square root error, or the absolute error between current three primary color gains and previous three primary color gains. In other words, the second error can be regarded as the white balance error of the second color space.

Further, in the AWB adjusting system 100, details of adaptively updating the three primary color gains (i.e., such as $R_{GAIN}$ and $B_{GAIN}$) are illustrated below. In the AWB adjusting system 100, the white balance can be adjusted according to the three primary color gains. When the three primary color gains are gradually updated, it implies that the white balance of the image can be calibrated accordingly. Further, when the second error of the three primary color gains increases, the processor 13 can increase an updating step of the three primary color gains for increasing a convergence rate of adjusting the white balance of the image. The convergence rate can be generated according to a predefined rate or a query table saved in the memory 11. Conversely, when the second error of the three primary color gains decreases, the processor 13 can reduce the updating step of the three primary color gains for decreasing the convergence rate of adjusting the white balance of the image, thereby reducing the phenomenon of image jitter.

Further, in the AWB adjusting system 100, details of adaptively updating the white pixel area R are illustrated below. In the AWB adjusting system 100, the white pixel area R can be adjusted according to a result of updating the white balance. When the white color of the white balanced image approaches "white reference", the AWB adjusting system 100 can reduce the white pixel area R. Conversely, when the white color of the white balanced image deviates from the "white reference", the AWB adjusting system 100 can enlarge the white pixel area R. In practice, the processor 13 can set an error threshold value. When the first error and the second error are smaller than the error threshold value, it implies that the white color of the white balanced image approaches "white reference". Thus, the processor 13 can reduce the white pixel area R. When the first error or the second error is smaller than the error threshold value, the processor 13 can maintain the white pixel area R and continuously detect the first error and the second error. Further, when the first error and the second error are greater than or equal to the error threshold value, it implies that the white color of the white balanced image deviates from the "white reference". Thus, the processor 13 can enlarge the white pixel area R. Further, a range of reducing the white pixel area R and a range of enlarging the white pixel area R by the processor 13 can be customized. An updating frequency of adjusting the white balance in the AWB adjusting system 100 can also be customized. For example, the updating frequency of adjusting the white balance can be configured as a single frame-based updating frequency, a double frame-based updating frequency, or a customized frequency.

Figure 4:
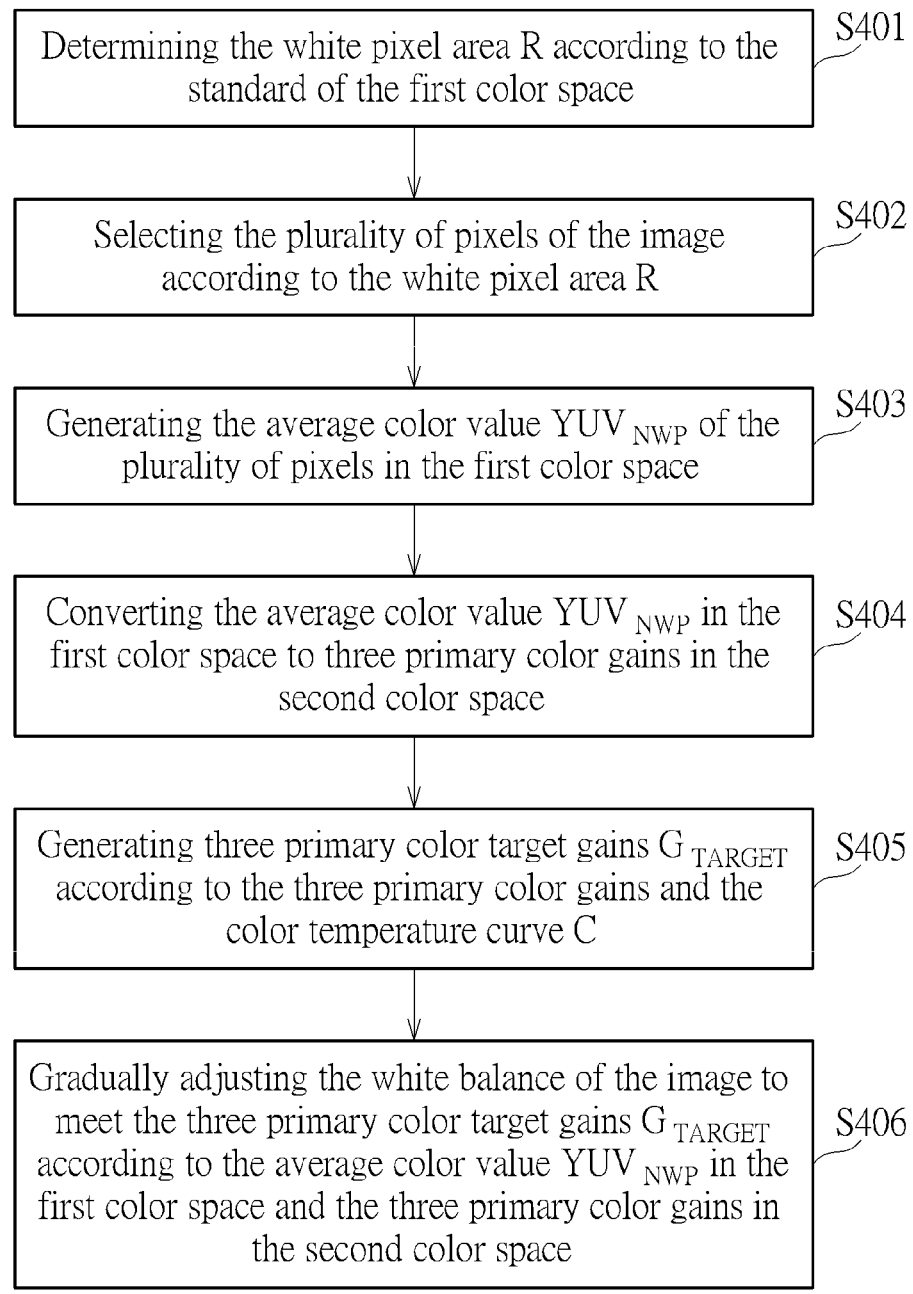
FIG. 4 is a flow chart of performing an auto white balance adjusting method by the auto white balance adjusting system in FIG. 1.

FIG. 4 is a flow chart of performing an auto white balance adjusting method by the auto white balance adjusting system 100. The auto white balance adjusting method can include step S401 to step S406. Any reasonable technology modification falls into the scope of the present invention. Step S401 to step S406 are illustrated below.

step S401: determining the white pixel area R according to the standard of the first color space;

step S402: selecting the plurality of pixels of the image according to the white pixel area R;

step S403: generating the average color value $YUV_{NWP}$ of the plurality of pixels in the first color space;

step S404: converting the average color value $YUV_{NWP}$ in the first color space to three primary color gains in the second color space;

step S405: generating three primary color target gains $G_{TARGET}$ according to the three primary color gains and the color temperature curve C;

step S406: gradually adjusting the white balance of the image to meet the three primary color target gains $G_{TARGET}$ according to the average color value $YUV_{NWP}$ in the first color space and the three primary color gains in the second color space.

Details of step S401 to step S406 are previously illustrated. Thus, they are omitted here. In step S401 to step S406, the AWB adjusting system 100 can use two color spaces (i.e., such as the RGB color space and the YUV color space) for adjusting the white balance of the image. The YUV color space can be used for quickly estimating and detecting feedback light signals. Further, the color temperature curve in the RGB color space can be used to quickly search for the primary color gains. Therefore, the AWB adjusting system 100 can provide high robustness for correcting the white balance of the image under various light sources.

To sum up, the present invention discloses an auto white balance adjusting method and an auto white balance adjusting system. The auto white balance adjusting method belongs to a close-loop based white balance adjusting method. The auto white balance adjusting method can use two color spaces for adjusting the white balance of the image. Further, an error detection mechanism can be introduced to the auto white balance adjusting system for increasing the convergence rate and accuracy. A process of adaptively updating three primary color gains and a process of adaptively updating a white pixel area can also be introduced to the auto white balance adjusting method. Therefore, the auto white balance adjusting system can provide high robustness and high reliability for correcting the white balance of the image under various light sources.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An auto white balance adjusting method comprising:
   determining a white pixel area according to a standard of a first color space;
   selecting a plurality of pixels of an image according to the white pixel area;
   generating an average color value of the plurality of pixels in the first color space;
   converting the average color value in the first color space to three primary color gains in a second color space;
   generating three primary color target gains according to the three primary color gains and a color temperature curve; and
   gradually adjusting a white balance of the image to meet the three primary color target gains according to the average color value in the first color space and the three primary color gains in the second color space;
   wherein the first color space and the second color space are different.

2. The method of claim 1, wherein the first color space is a Luminance-Chrominance color space, and the second color space is a three primary color space.

3. The method of claim 1, wherein converting the average color value in the first color space to the three primary color gains in the second color space comprises:
   converting the average color value in the first color space to a red color gain, a green color gain, and a blue color gain in the second color space; and
   normalizing the red color gain, the green color gain, and the blue color gain for generating the three primary color gains in the second color space.

4. The method of claim 1, wherein generating the three primary color target gains according to the three primary color gains and the color temperature curve comprises:
   setting a threshold value;
   acquiring a distance between the three primary color gains and the color temperature curve in a coordinate system of the second color space;
   setting the three primary color gains as the three primary color target gains when the distance is smaller than the threshold value; and
   acquiring a projection point of the three primary color gains on the color temperature curve for setting the projection point as the three primary color target gains when the distance is greater than or equal to the threshold value.

5. The method of claim 1, further comprising:
   setting a white pixel target value in the first color space;
   acquiring a first error between the average color value and the white pixel target value;
   updating the three primary color gains in the second color space when the white balance of the image is gradually adjusted; and
   acquiring a second error of the three primary color gains when the three primary color gains are updated.

6. The method of claim 5, further comprising:
   increasing an updating step of the three primary color gains for increasing a convergence rate of adjusting the white balance of the image when the second error of the three primary color gains increases;
   wherein the convergence rate is generated according to a predefined rate or a query table.

7. The method of claim 5, further comprising:
   reducing an updating step of the three primary color gains for decreasing a convergence rate of adjusting the white balance of the image when the second error of the three primary color gains decreases;
   wherein the convergence rate is generated according to a predefined rate or a query table.

8. The method of claim 5, further comprising:
   setting an error threshold value; and
   reducing the white pixel area when the first error and the second error are smaller than the error threshold value.

9. The method of claim 5, further comprising:
   setting an error threshold value; and
   continuously detecting the first error and the second error and maintaining the white pixel area when the first error or the second error is smaller than the error threshold value.

10. The method of claim 5, further comprising:
    setting an error threshold value; and
    enlarging the white pixel area when the first error and the second error are greater than or equal to the error threshold value.

11. An auto white balance adjusting system comprising:
    an image capturing device configured to acquire an image;
    a memory configured to save data;
    an output device configured to output a white balance adjusted image; and
    a processor coupled to the image capturing device, the memory, and the output device and configured to control the image capturing device, the memory, and the output device;
    wherein after the image capturing device acquires the image, the processor determines a white pixel area according to a standard of a first color space saved in the memory, the processor selects a plurality of pixels of an image according to the white pixel area, the processor generates an average color value of the plurality of pixels in the first color space, the processor converts the average color value in the first color space to three primary color gains in a second color space, the processor generates three primary color target gains according to the three primary color gains and a color temperature curve, the processor gradually adjusts a white balance of the image to meet the three primary color target gains according to the average color value in the first color space and the three primary color gains in the second color space, and the processor controls the output device to output the white balance adjusted image.

12. The system of claim 11, wherein the first color space is a Luminance-Chrominance color space, and the second color space is a three primary color space.

13. The system of claim 11, wherein the processor converts the average color value in the first color space to a red color gain, a green color gain, and a blue color gain in the second color space, and the processor normalizes the red color gain, the green color gain, and the blue color gain for generating the three primary color gains in the second color space.

14. The system of claim 11, wherein the processor sets a threshold value, acquires a distance between the three primary color gains and the color temperature curve in a coordinate system of the second color space, sets the three primary color gains as the three primary color target gains when the distance is smaller than the threshold value, and acquires a projection point of the three primary color gains on the color temperature curve for setting the projection point as the three primary color target gains when the distance is greater than or equal to the threshold value.

15. The system of claim 11, wherein the processor sets a white pixel target value in the first color space, acquires a first error between the average color value and the white pixel target value, updates the three primary color gains in the second color space when the white balance of the image is gradually adjusted, and acquires a second error of the three primary color gains when the three primary color gains are updated.

16. The system of claim 15, wherein the processor increases an updating step of the three primary color gains for increasing a convergence rate of adjusting the white balance of the image when the second error of the three primary color gains increases, and the convergence rate is generated according to a predefined rate or a query table.

17. The system of claim 15, wherein the processor reduces an updating step of the three primary color gains for decreasing a convergence rate of adjusting the white balance of the image when the second error of the three primary color gains decreases, and the convergence rate is generated according to a predefined rate or a query table.

18. The system of claim 15, wherein the processor sets an error threshold value, and reduces the white pixel area when the first error and the second error are smaller than the error threshold value.

19. The system of claim 15, wherein the processor sets an error threshold value, and continuously detects the first error and the second error and maintains the white pixel area when the first error or the second error is smaller than the error threshold value.

20. The system of claim 15, wherein the processor sets an error threshold value, and enlarges the white pixel area when the first error and the second error are greater than or equal to the error threshold value.

* * * * *